(12) United States Patent
Hill et al.

(10) Patent No.: US 10,661,545 B1
(45) Date of Patent: May 26, 2020

(54) PACKAGING METHOD

(71) Applicant: QUALITY PACKAGING CORP., High Point, NC (US)

(72) Inventors: Jerry L. Hill, Oak Ridge, NC (US); Robert B. Lett, III, High Point, NC (US); Dewey Wayne Hill, Oak Ridge, NC (US)

(73) Assignee: Quality Packaging Corp., High Point, NC (US)

( * ) Notice: Subject to any disclaimer, the term of this patent is extended or adjusted under 35 U.S.C. 154(b) by 573 days.

(21) Appl. No.: 15/058,317

(22) Filed: Mar. 2, 2016

(51) Int. Cl.
| | | |
|---|---|---|
| *B32B 37/12* | (2006.01) | |
| *B32B 3/28* | (2006.01) | |
| *B32B 7/12* | (2006.01) | |
| *B32B 29/08* | (2006.01) | |
| *B32B 27/32* | (2006.01) | |
| *B32B 27/10* | (2006.01) | |

(52) U.S. Cl.
CPC .............. *B32B 37/12* (2013.01); *B32B 3/28* (2013.01); *B32B 7/12* (2013.01); *B32B 27/10* (2013.01); *B32B 27/32* (2013.01); *B32B 29/08* (2013.01); *B32B 2317/127* (2013.01); *B32B 2323/04* (2013.01)

(58) Field of Classification Search
CPC .......... B32B 27/10; B32B 29/08; B32B 3/28; B32B 37/12; B32B 7/12; B32B 2317/127; B32B 2323/04; B65D 81/3886
USPC .......................................................... 53/449
See application file for complete search history.

(56) References Cited

U.S. PATENT DOCUMENTS

| | | | | |
|---|---|---|---|---|
| 479,999 | A * | 8/1892 | Thompson | B32B 29/08 428/183 |
| 2,042,586 | A * | 6/1936 | Campbell | E04C 2/322 112/428 |
| 2,642,372 | A * | 6/1953 | Chittick | B31F 1/2895 428/121 |
| 3,247,645 | A | 4/1966 | Van Antwerpen et al. | |
| 5,205,473 | A * | 4/1993 | Coffin, Sr. | B65D 3/22 206/813 |
| 5,546,729 | A | 8/1996 | Pienta | |
| 5,733,403 | A * | 3/1998 | Morley | B31D 3/005 156/193 |
| 5,750,235 | A * | 5/1998 | Yoshimasa | B31F 1/0009 428/134 |
| 5,944,252 | A * | 8/1999 | Connelly | B31D 3/005 229/132 |

(Continued)

OTHER PUBLICATIONS

Box Master, Box Basic, History of Corrugated Boxes, Feb. 2015.*

*Primary Examiner* — Andrew M Tecco
*Assistant Examiner* — Nicholas E Igbokwe
(74) *Attorney, Agent, or Firm* — Tuggle Duggins P.A.; Blake P. Hurt

(57) ABSTRACT

A single-face corrugated paper substrate with a polymeric layer formed from polyethylene attached to the corrugated (i.e. fluted) side of a twenty-three/twenty-three (23/23) basis weight substrate which is positioned around an article and between opposingly oriented trays formed from reinforced corrugated material is provided. The article enjoys protection from scratches, scrapes, and abrasions by virtue of the surrounding paper, but the shipper enjoys reduced cost by virtue of the reduction in packaging materials and reduction in total shipment weight. A method of forming and deploying the aforementioned substrate is also provided.

18 Claims, 2 Drawing Sheets

(56) References Cited

U.S. PATENT DOCUMENTS

| | | | | |
|---|---|---|---|---|
| 6,083,580 A * | 7/2000 | Finestone | ............. | B31F 1/2813 |
| | | | | 428/34.2 |
| 6,139,938 A * | 10/2000 | Lingle | ....................... | B31F 1/28 |
| | | | | 428/182 |
| 7,045,196 B1 * | 5/2006 | Hill | ........................ | B32B 29/08 |
| | | | | 428/137 |
| 8,753,731 B2 * | 6/2014 | Dunn | ....................... | B32B 3/12 |
| | | | | 428/116 |
| 2009/0321508 A1 * | 12/2009 | Fu | ....................... | B29C 44/1233 |
| | | | | 229/403 |
| 2011/0114657 A1 * | 5/2011 | Nygaard | ................ | B65D 23/12 |
| | | | | 220/738 |
| 2012/0005989 A1 * | 1/2012 | Weder | .................... | A41G 1/009 |
| | | | | 53/449 |
| 2012/0285972 A1 * | 11/2012 | Fu | ....................... | B65D 81/3853 |
| | | | | 220/592.2 |

\* cited by examiner

PACKAGING METHOD

FIELD OF THE INVENTION

The invention herein pertains to a method of packaging articles and particularly pertains to a method of packaging articles with a single-face corrugated web with a layer of polymeric or otherwise non-abrasive material attached to the corrugated side of the substrate positioned around an article and between opposingly oriented trays formed from reinforced material, such as a greater weight corrugated material.

DESCRIPTION OF THE PRIOR ART AND OBJECTIVES OF THE INVENTION

Wrapping an article for protection, for example for the purposes of transportation, is a time-honored tradition in the manufacturing business, and is well-known in the prior art. Depending on the size, shape, and weight of the article, the material used to protect the article varies and is typically some embodiment of paper substrate, but can span the structural spectrum from plastic wrap and lightweight paper to reinforced cardboard and metallic containers. The difficult balancing act in this practice has long been the tradeoff between protecting the article within the packaging, and the increased cost of packaging material, labor, and transportation costs. This search for an efficient answer has spawned several creative, but ultimately deficient, solutions known in the art. For example, some manufacturers will reinforce certain portions of the packaging to a greater extent than other portions, for example with foam or additional material layers at the ends or corners that encounter the most impact or wear. Other manufacturers will deploy more than one packaging material, such as plastic or paper wrap followed by heavier cardboard or metallic surround. Both of these attempts resulting in greater labor and material costs, and are therefore unfavorable.

Thus, in view of the problems and disadvantages associated with prior art practices, the present invention was conceived and one of its objectives is to provide a method of packaging an article including the step of printing on a first web referred to as the liner.

It is another objective of the present invention to provide a method of packaging an article including the steps of passing a second web through a single face corrugator, moving past a first preheater, fluting between two or more corrugating rolls forming corrugated ribs or flutes in the second web, compressing against one of the corrugating rolls via pressing, vacuum, or positive pressure, and applying glue to at least one of the corrugated web or the liner.

It is still another objective of the present invention to provide a method of packaging an article including the steps of passing the first web past a second preheater, compressing the first web atop the second web via a pressure roll, and forming a single-face corrugated substrate with the first web serving as the liner surface and the second web serving as the corrugated surface.

It is yet another objective of the present invention to provide a method of packaging an article including the steps of passing the single-face substrate up and over a bridge positioned vertically and laterally distal the corrugator to cool, and accumulating the cooled single-face substrate in a compact location proximate a glue station.

It is a further objective of the present invention to provide a method of packaging an article including the steps of passing through a winder, applying glue to the corrugated surface opposite the linear surface, affixing a polymeric film or other, non-abrasive material to the glued surface, and rewinding the resulting assembly into a roll.

It is still a further objective of the present invention to provide a method of packaging an article including the steps of mounting the combination roll of single-face corrugated material and polymeric film to a distribution machine, dispensing a predetermined length of the combination substrate, and separating the predetermined length of substrate from the total roll length.

It is yet a further objective of the present invention to provide a method of packaging an article including the steps of placing an article into one or more reinforced end trays, surrounding the intervening article surface with the predetermined length of combination substrate, inserting one or more ends of the substrate between the article and the one or more reinforced end trays, and affixing the length of substrate so as to prevent inadvertent disassociation from the article.

Various other objectives and advantages of the present invention will become apparent to those skilled in the art as a more detailed description is set forth below.

SUMMARY OF THE INVENTION

The aforesaid and other objectives are realized by providing a single-face corrugated substrate with a non-abrasive layer formed from a polymer such as polyethylene attached to the corrugated (i.e. fluted) side of a twenty-three/twenty-three (23/23) weight paper web which is positioned around an article and between opposingly oriented trays formed from reinforced corrugated. The article enjoys protection from scratches, scrapes, and abrasions by virtue of the surrounding single face, but the shipper enjoys reduced cost by virtue of the reduction in packaging materials and reduction in total shipment weight. A method of forming and deploying the aforementioned substrate is also provided and includes the steps of printing a badge or label on a first web layer known as the liner, passing a second web layer through a single face corrugator, moving at least the second web layer past a first preheater, fluting the second web layer between two or more corrugating rolls forming corrugated flutes therein, compressing the second web layer against one of the corrugating rolls via pressing, vacuum, or positive pressure, and applying glue to the corrugation flutes for adherence to the liner. The corrugated substrate is mounted to a distribution machine, dispensing a predetermined length of the combination substrate, and separating the predetermined length of substrate from the total roll length. The length of material is wrapped around an article and seated at either end with a tray formed from a more robust, reinforced material to keep the article safe during shipping and delivery.

DETAILED DESCRIPTION OF THE PREFERRED EMBODIMENT AND OPERATION OF THE INVENTION

Figure 1:
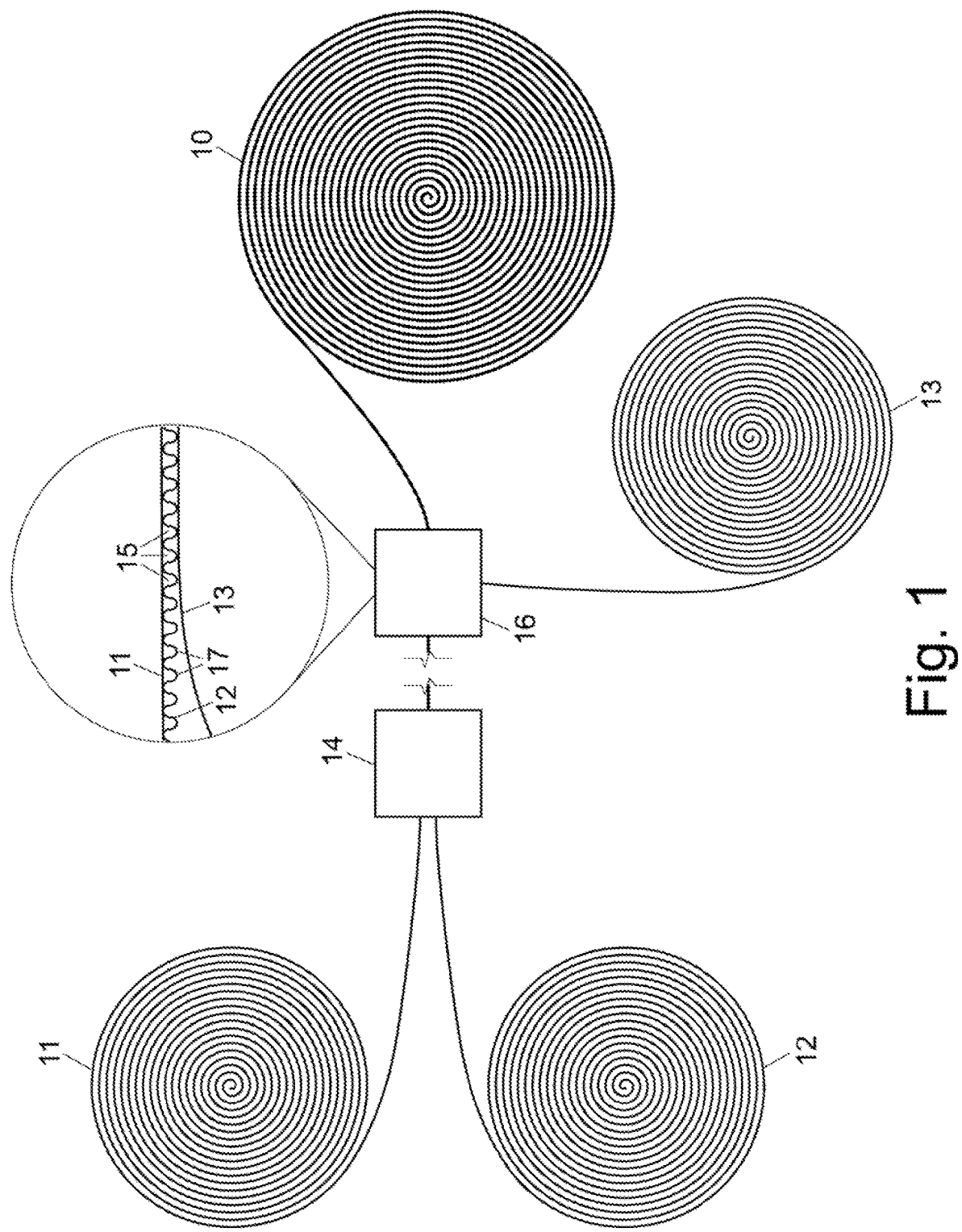
FIG. 1 shows a schematic representation of the forming of a single-face corrugated substrate with a non-abrasive layer.

For a better understanding of the invention and its operation, turning now to the drawings, FIG. 1 illustrates a schematic diagram used to produce single-face corrugated substrate 10 formed by adhering first web 11 to second web 12 and then attaching a non-abrasive material layer such as polymeric layer 13 thereto. In the preferred embodiment of substrate 10, first web 11 is formed from paper or paperboard resulting from the pulp of trees that has been cooked, digested, dissolved, pressurized, and pressed as is known in the art. In a representative embodiment, first web 11 and second web 12 are each formed from a paper-based material, and more specifically a formulation known as kraft paper that is formed by wood chips that are placed in a large, high-pressure tank called a batch digester, where they are cooked in a solution, or liquor, made of sodium hydroxide (NaOH) and several other ionic compounds such as sulfates, sulfides, and sulfites. These strongly alkaline chemicals dissolve the lignin, the glue-like substance that holds the individual wood fibers together in a tree form. When the pressure is released in the digester after several hours, the wood chips explode into fluffy masses of fiber. After one or more additional cleaning and refining steps, a slurry of wood pulp fibers is pumped to the paper-making machine, also known as a Fourdrinier machine. Square structures up to six hundred feet long, these machines may contain a wire mesh in which the paper is initially formed. Next, the paper is fed into steam-heated rollers and wide felt blankets that remove the water. At the end, the finished medium, or liner, is rolled for shipment. This process is intended for exemplary use only, and is not intended to limit the scope of the instant invention. In the preferred embodiment, the resulting web material from the above process is a single face, 23/23 weight corrugated substrate, which has historically been considered structurally inferior to other, more robust packaging materials and thus was disfavored as a shipping material. Only in connection with the novel packaging process described herein is it considered an advantageous packaging substance. It is also advantageous to rely on a single face corrugated substrate as it can be deformed about a wide range of articles without the need of significant cutting, which reduces the time necessary to place the substrate about an article, increases packing personnel safety, and provides coverage for a greater number of articles than conventional solutions.

Returning to FIG. 1, first web 11 (also referred to herein as a liner layer), may be printed on an exterior surface with corporate markings, packing and shipping instructions, or other indicia prior to being affixed to second web 12. This printing step should not be overlooked, as it is reasonable in large part for the aesthetically pleasing appearance of the packaged article, with particular emphasis on the appearance of a box, but without the necessary material and corresponding cost. First web 11 and second web 12 are preferably affixed via a single-face corrugator, represented schematically by numeral 14 in FIG. 1. As would be understood by one skilled in the art, single-faced corrugator 14 may pass first web 11 and second web 12 over one or more preheating drums (not shown). Second web 12 is passed through one or more corrugation cogs, which are typically cylindrical structures with a plurality of teeth known as flutes defined thereon (not shown). Second web 12 is urged about these cogs and forced into the spaces between the flutes, producing a medium with flutes 15, preferably extending in the lateral direction relative to the web. A binder, usually in the form of an adhesive, is applied to one or both web surfaces, with particular emphasis on the fluted surfaces proximate first web 11. First web 11 and second web 12 are then pressed together, usually in the presence of a vacuum or positive pressure environment, to produce a substrate that defines a flat, planar surface on a first side and a fluted, corrugated surface on a second side. Despite the view of structural inferiority, the fluted nature of second web 12 results in a material that is resistant to a wide variety of cuts, abrasions, scratches, and crush-related damage.

Although not demonstrated in FIG. 1, the web material resulting from the combination of first web 11 and second web 12 may travel a specified distance to cool (for example, a distance greater than twenty feet), preferably displacing vertically up, across, and down a raised structure known as a bridge, before accumulating in sheets, a roll, or simply a pile in close proximity to an adhesive applicator, indicated generally in FIG. 1 with numeral 16. This process is preferably, not only to give the corrugated substrate time to cool and accumulate, but also because it provides a logistic advantage that permits other structures to be positioned below the bridge, providing a logistical advantage over the prior art. By way of example, and not intended as a limitation, applicator 16 may include one or more rollers for engaging the accumulated web material and passing it above or below an adhesive application member such as a roller (not shown) that preferably administers adhesive 17 to the surface of flutes 15 opposite the respective surfaces bound to first web 11 as described above, or the surface of first web 11 as desired. Polymeric layer 13, preferably formed from a polymer such as polyethylene (for example UHMWPE, HDPE, XLPE, MDPE, LLDPE, LDPE, or VLDPE), is then applied to the surfaces of flutes 15 carrying the adhesive 17 described above, and may further be urged together, for example by rolling, pressing, or the like, producing single-face corrugated substrate 10. Substrate 10 may then by rewound onto a roll and is ready for use. While the aforementioned polymeric materials are preferred for layer 13, other non-abrasive materials such as open cell foam, tissue paper, and wax coatings are also contemplated within the scope of the instant invention.

Figure 2:
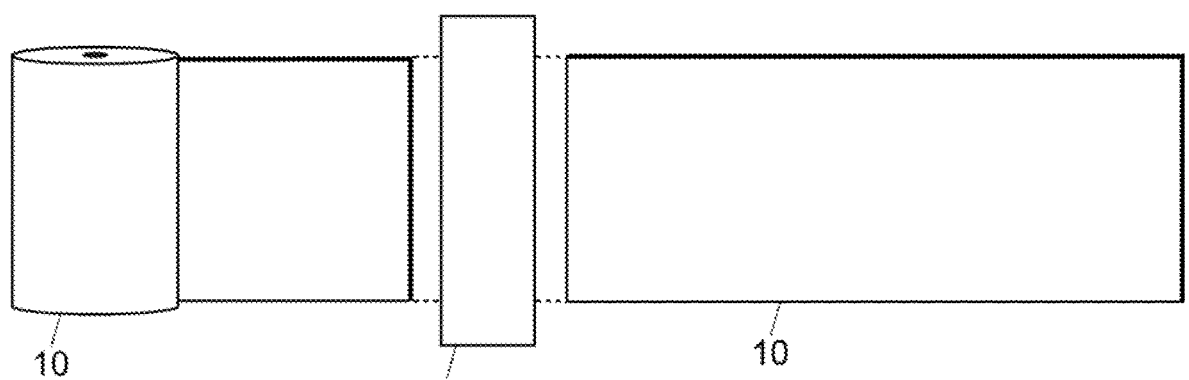
FIG. 2 pictures the removal of the substrate of FIG. 1 from a larger roll.
Figure 3:
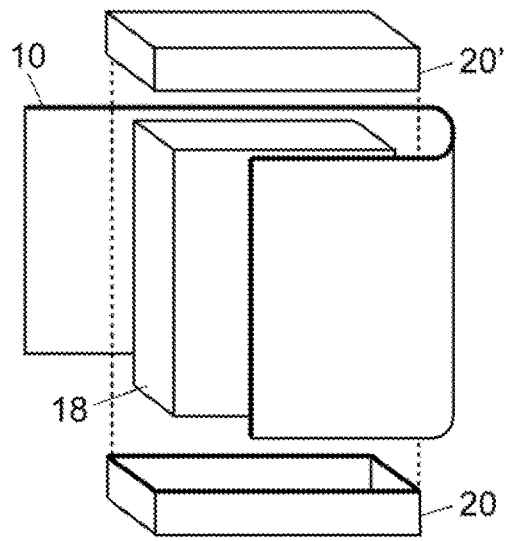
FIG. 3 depicts the placement of the separated substrate of FIG. 2 around an article.
Figure 4:
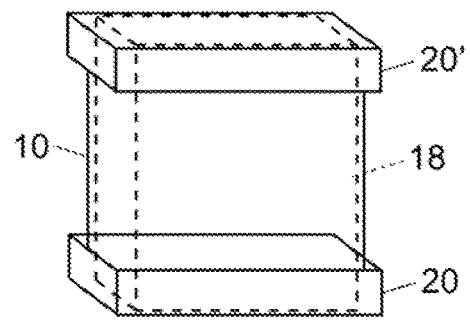
FIG. 4 demonstrates a completely packaged article utilizing the separated substrate of FIG. 2.

A method of efficiently packaging an article 18 utilizing single-face corrugated substrate 10 is also provided. The production and provision of substrate 10, a material long thought to be structurally inferior to other packaging substrates and thus not suitable for the treacherous environments common in commercial shipping, is described above. Substrate 10 is then loaded onto a distribution mechanism, for example a device similar to that described in co-pending U.S. patent application Ser. No. 15/336,940, incorporated by reference herein in its entirety and referenced generally in FIG. 2 with numeral 19. A length of substrate 10 is removed from the larger volume and placed in close proximity to article 18, preferably manually or mechanically, as demonstrated in FIG. 3. In a representative embodiment, article 18 is placed in tray 20 which is formed from a more robust material than substrate 10, for example a greater paper weight, a reinforced cardboard, or a metal material. Tray 20' is placed at the opposing end of article 18, defining a longitudinal gap in packaging material therebetween. Substrate 10 is then wrapped around article 18 and inserted into a void or space between article 18 and trays 20, 20'. In an embodiment of this method, an adhesive (not shown) may be affixed to one end of substrate 10 to adhere to the exterior surface of the substrate, preventing inadvertent disassociation from article 18. In an alternate embodiment, a biasing member (not shown) such as a resilient band or strap is placed around article 18 atop substrate 10 for the same purpose as the adhesive described above. The result, as pictured in FIG. 4, is article 18 (demonstrated in dotted fashion to indicate position beneath substrate 10) that includes trays 20, 20' positioned at opposing ends of article 18 and is wrapped with substrate 10 between said trays. This configuration will prevent the overwhelming number of crush damage events, which occur with great frequency at the respective ends of articles but rarely in the middle, as well as scratch, rub, abrasion, and scrape damage between trays 20, 20' by virtue of surrounding substrate 10, while also enjoying the lower cost of materials and lower weight than other solutions taught by the prior art.

To facilitate the quick and efficient packaging method described above, as well as to provide greater flexibility to accommodate a greater range of article sizes common in present manufacturing settings, substrate 10 may be scored in one or more places to permit easy folding of substrate 10 about article 18, which is not otherwise possible with boxes as currently practiced in the art without cutting the box sidewall. By way of example, and not limitation, substrate 10 may define a width of forty-two inches (106.68 cm) with at least one score defined therein approximately three inches (7.62 cm) inward from an upper edge, a width of thirty inches (76.20 cm) with a plurality of scores defined therein approximate three inches, six inches, and nine inches (7.62 cm, 15.24 cm, and 22.86 cm, respectively) inward from an upper edge, or a width of eighteen inches (45.72 cm) with a plurality of scores defined therein approximately three inches and six inches (7.62 cm and 15.24 cm, respectively) inward from an upper edge.

The illustrations and examples provided herein are for explanatory purposes and are not intended to limit the scope of the appended claims. For example, article 18 is represented as a uniform rectangular but it should be understood that many different shapes of article 18 could similarly be packaged and transported utilizing substrate 10. Similarly, trays 20, 20' should be understood to conform in size and shape to the dimensions defined by article 18, and longer, shorter, wider, narrower, or deeper trays 20, 20' are within the scope of the instant disclosure. While described in reference to single-face corrugated medium, this disclosure should be construed to include applications resulting from additional medium layers, known as double-faced or double-walled substrates. Additionally, the preferred substrate basis weight as disclosed is defined as 23/23, despite the previously held notion that such a substrate was inferior as a packing material, but nothing should be construed as a limitation in this disclosure, as other single-face corrugated substrates may also fall within the scope of the instant invention.

We claim:

1. A method of forming a packaging substrate (10) for packaging an article (18) by wrapping the packaging substrate (10) around the article (18) so as to orient a polymeric layer (13) more proximate the article (18) relative to a first layer (11) to prevent scratching, rubbing, and abrasion of the article (18), the method comprising
    providing first web layer (11), second web layer (12), and polymeric layer (13) separate from the first and second web layers (11)(12),
    preheating at least the first web layer (11),
    urging the second web layer (12) via a mechanical member to define a plurality of flutes (15),
    attaching the first web layer (11) to the second web layer (12) so as to define a single-face corrugated web,
    cooling the single-face corrugated web, and
    selectively affixing the polymeric layer (13) to the plurality of flutes (15) of the second web layer (12) at a position in opposing relation relative to the first web layer (11),
    wherein the packaging substrate (10) defines a degree of flexibility configured to be wrapped around a cabinet.

2. The method of claim 1 further comprising affixing the polymeric layer (13) to the second web layer (12) via an adhesive (17).

3. The method of claim 1 wherein the first web layer (11) is formed from a paper-based material.

4. The method of claim 1 wherein the second web layer (12) is formed from a paper-based material.

5. The method of claim 1 wherein the first web layer (11) and the second web layer (12) are formed from a paper-based material.

6. The method of claim 5 wherein the first and second web layers (11)(12) are formed from a paper-based material defining a weight of 23/23.

7. The method of claim 6 further comprising:
    providing a tray (20), and
    placing the article (18) within the tray (20).

8. The method of claim 1 further comprising printing indicia on a surface of first web layer (11).

9. The method of claim 1, whereby selectively affixing the polymeric layer (13) to the plurality of flutes (15) further comprises affixing the polymeric layer (13) to all of the plurality of flutes (15) of the second web layer (12) at a position in opposing relation relative to the first web layer (11).

10. A method of forming a packaging substrate (10) for packaging an article (18) by wrapping the packaging substrate (10) around the article (18) so as to orient a foam layer (13) more proximate the article (18) relative to a first web layer (11) to prevent scratching, rubbing, and abrasion of the article (18), the method comprising
    providing first web layer (11), second web layer (12), and foam layer (13) separate from the first and second web layers (11)(12),
    preheating at least the first web layer (11),
    urging the second web layer (12) via a mechanical member to define a plurality of flutes (15),
    attaching the first web layer (11) to the second web layer (12) so as to define a single-face corrugated web,
    cooling the single-face corrugated web, and
    selectively attaching the foam layer (13) to the plurality of flutes (15) of the second web layer (12) at a position in opposing relation relative to the first web layer (11),
    wherein the packaging substrate (10) defines a degree of flexibility configured to be wrapped around a cabinet.

11. The method of claim 10 further comprising affixing the foam layer (13) to the second web layer (12) via an adhesive (17).

12. The method of claim 10 wherein the first web layer (11) is formed from a paper-based material.

13. The method of claim 10 wherein the second web layer (12) is formed from a paper-based material.

14. The method of claim 10 wherein the first web layer (11) and the second web layer (12) are formed from a paper-based material.

15. The method of claim 14 wherein the first and second web layers (11)(12) are formed from a paper-based material defining a weight of 23/23.

16. The method of claim 15 further comprising:
    providing a tray (20), and
    placing the article (18) within the tray (20).

17. The method of claim 10 further comprising printing indicia on a surface of first web layer (11).

18. The method of claim 10, whereby selectively affixing the foam layer (13) to the plurality of flutes (15) further comprises affixing the foam layer (13) to all of the plurality of flutes (15) of the second web layer (12) at a position in opposing relation relative to the first web layer (11).

* * * * *